United States Patent
Sanvido

(10) Patent No.: US 8,014,097 B1
(45) Date of Patent: Sep. 6, 2011

(54) DISK DRIVE WITH ADAPTIVE COUNTING OF WRITES TO THE DATA TRACKS FOR MINIMIZING THE EFFECT OF ADJACENT TRACK ENCROACHMENT

(75) Inventor: Marco Sanvido, Belmont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/776,244

(22) Filed: May 7, 2010

(51) Int. Cl.
G11B 19/04 (2006.01)
G11B 5/02 (2006.01)
G06F 12/00 (2006.01)

(52) U.S. Cl. .............................. 360/60; 360/55; 711/112

(58) Field of Classification Search .................. None
See application file for complete search history.

(56) References Cited

U.S. PATENT DOCUMENTS

| | | | |
|---|---|---|---|
| 5,600,500 | A | 2/1997 | Madsen et al. |
| 6,442,705 | B1 | 8/2002 | Lamberts |
| 6,947,234 | B2 | 9/2005 | Lamberts et al. |
| 7,227,708 | B2 | 6/2007 | Feng |
| 7,567,400 | B2 | 7/2009 | Cheng |
| 2006/0066971 | A1 | 3/2006 | Alex et al. |
| 2008/0239901 | A1* | 10/2008 | Tsunokawa et al. ....... 369/53.15 |
| 2009/0091861 | A1 | 4/2009 | Takano et al. |
| 2009/0244775 | A1 | 10/2009 | Ehrlich |

OTHER PUBLICATIONS

Awerbuch, "Optimal distributed algorithms for minimum weight spanning tree, counting, leader election, and related problems", Proceedings of the nineteenth annual ACM symposium on Theory of computing, 1987, pp. 230-240.
Li et al., "Adjacent Track Erasure Analysis and Modeling at High Track Density", IEEE Transactions on Magnetics, vol. 39, No. 5, Sep. 2003, pp. 2627-2629.
Fern et al., "Boosting Lazy Decision Trees", Proceedings of the Twentieth International Conference on Machine Learning (ICML-2003), Washington DC, 2003, vol. 20; Part 1, pp. 178-185.
Friedman et al., "Lazy Decision Trees", Proceedings of the National Conference on Artificial Intelligence, 1996, No. 13/V1, pp. 717-724.
D. Guarisco et al., "A Fast and Accurate Method for Measuring Adjacent-Track Erasure", IEEE Transactions on Magnetics, vol. 42, No. 12, Dec. 2006, pp. 3868-3873.
Y. Liu et al., "Characterization of Skip or Far Track Erasure in a Side Shield Design", IEEE Transactions on Magnetics, vol. 45, No. 10, Oct. 2009, pp. 3660-3663.

* cited by examiner

Primary Examiner — Andrew L Sniezek
(74) Attorney, Agent, or Firm — Thomas R. Berthold

(57) ABSTRACT

A hard disk drive (HDD) uses adaptive counting of writes to the data tracks to minimize the effect of adjacent track encroachment (ATE). The tracks are grouped into segments and a counter is associated with each segment, but the number of tracks in a segment varies or adapts depending on the number of writes to the segment. When the count for the number of writes to a segment reaches a threshold, the segment is divided into a number of segments with fewer tracks. The original segment no longer exists and does not require memory to store its count. This process continues until a segment reaches a predetermined minimum number of tracks. When the count for the number of writes to a segment with the minimum number of tracks reaches a threshold, all of the tracks in that segment, and tracks radially adjacent to and on both sides of the segment, are read and rewritten.

13 Claims, 3 Drawing Sheets

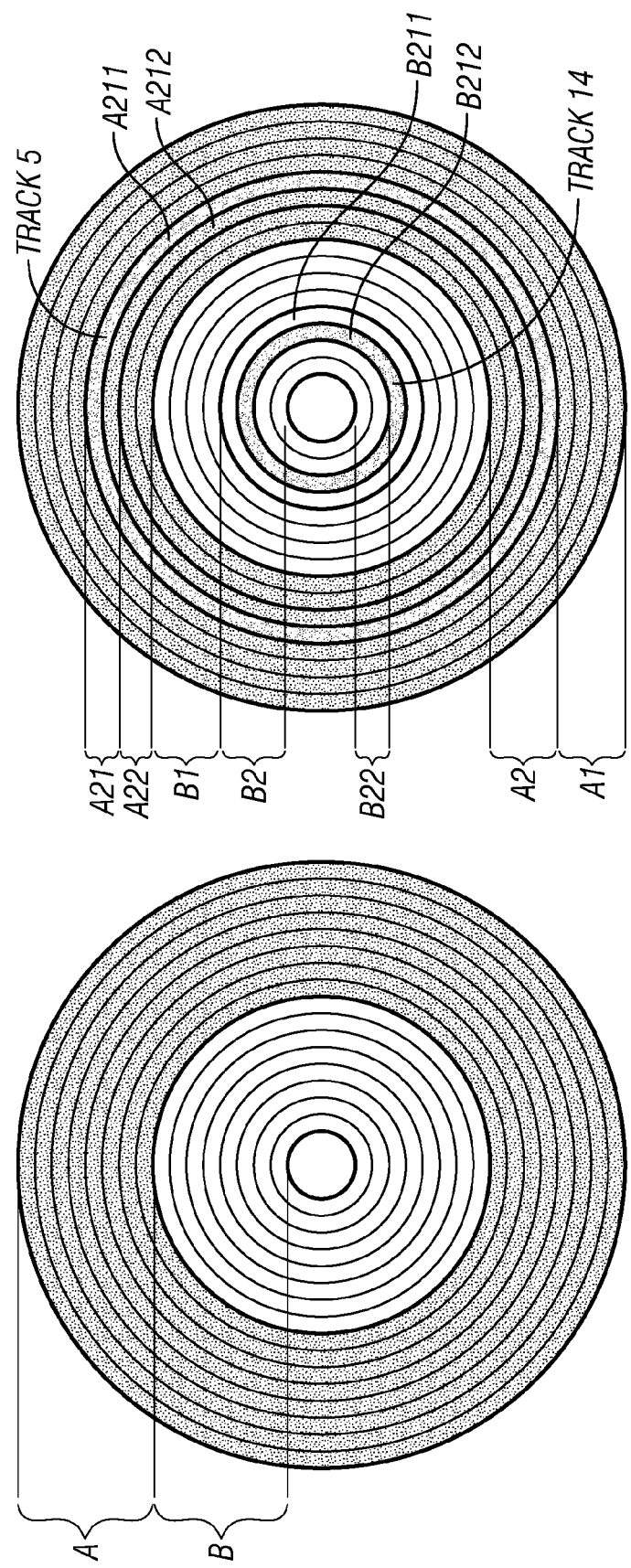

DISK DRIVE WITH ADAPTIVE COUNTING OF WRITES TO THE DATA TRACKS FOR MINIMIZING THE EFFECT OF ADJACENT TRACK ENCROACHMENT

BACKGROUND OF THE INVENTION

1. Field of the Invention

This invention relates generally to magnetic recording hard disk drives (HDDs), and more particularly to a HDD with high data track density that counts the number of writes to the data tracks to minimize the effect of adjacent track encroachment (ATE) during writing.

2. Description of the Related Art

HDDs with high data density are required to have high data track density, which means that the concentric data tracks are packed closer together. High track density increases the problem of adjacent track encroachment (ATE). ATE occurs when old data stored in tracks adjacent to the track being written become degraded after many writings to the data track. ATE generally translates into an increase in bit error rate (BER), resulting in degradation of the performance and reliability of the HDD.

One approach for addressing the ATE problem is to count the number of writes to each track. When a track has been written to a predetermined number of times, that track and one or more adjacent tracks on both sides of it are read and then rewritten. The effects of ATE cannot build up because significant repetitive writing of a single track is avoided. This approach is described in U.S. Pat. No. 7,567,400 B2, which is assigned to the same assignee as this application. However, because HDDs may have a very large number of tracks, e.g., several hundred thousand, a significant amount of memory may be required to be allocated to store the counts for each track.

Thus what is needed is a HDD that counts the writes to the data tracks in a manner that makes efficient use of memory and still effectively addresses the problem of ATE.

SUMMARY OF THE INVENTION

This invention relates to a HDD that uses adaptive counting of writes to the data tracks to minimize the effect of ATE. The tracks are grouped into segments and a counter is associated with each segment, but the number of tracks in a segment is not fixed, but varies or adapts depending on the number of writes to the segment. Thus a segment can have a "coarse" granularity, meaning that it has a relatively large number of tracks, or a "fine" granularity, meaning that it has a relatively small number of tracks. As the count for the number of writes to a coarse segment increases and then reaches a predetermined threshold, the segment is divided into a number of finer segments with fewer tracks. The original segment no longer exists and does not require memory to store its count. This process continues and the segments continue to be divided into finer granularity segments with fewer tracks until a segment reaches a predetermined minimum number of tracks, for example only one track. When the count for the number of writes to a segment with the minimum number of tracks reaches a predetermined threshold, all of the tracks in that segment, and tracks radially adjacent to and on both sides of the segment, are read and rewritten, preferably to the same tracks, and the counter for that segment is reset to zero.

The adaptive counting may also be extended beyond a single track to individual data sectors within the tracks. When the count for the number of writes to a segment with only one track reaches a predetermined threshold, instead of reading and rewriting that single track, the operation can continue with the one-track segment being divided into sub-segments, where each sub-segment contains a plurality of the data sectors of that track.

The invention also includes a "garbage collection" (GC) process of the counters in memory that results in a re-grouping of the segments. GC can be performed after a predetermined time that the adaptive counting has been in operation, for example after a fixed time, on a regular basis such as at HDD start up, during idle time, or when the memory used approaches the memory allocated for the adaptive counting process. In the GC process segments are identified as those that have not been written to since the last GC, those segments are regrouped into coarser granularity segments and the counters for those segments are freed up.

For a fuller understanding of the nature and advantages of the present invention, reference should be made to the following detailed description taken together with the accompanying figures.

BRIEF DESCRIPTION OF THE DRAWING

FIGS. 4A-4B are graphical illustrations of a disk before (FIG. 4A) and after (FIG. 4B) the adaptive counting operation according to the invention.

DETAILED DESCRIPTION OF THE INVENTION

Figure 1:
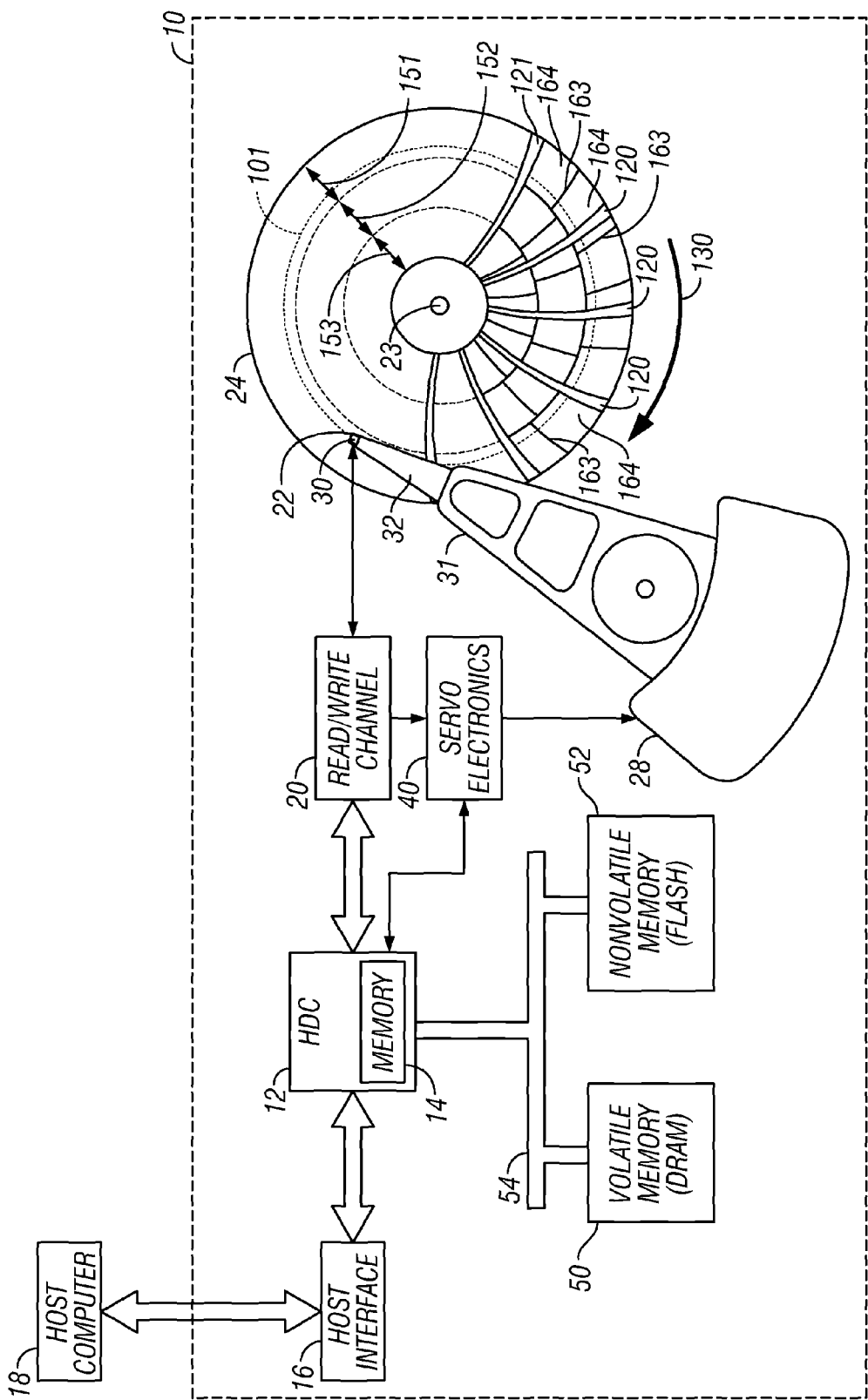
FIG. 1 is a block diagram of a magnetic recording hard disk drive (HDD) according to this invention.

FIG. 1 is a block diagram of a magnetic recording disk drive (HDD) 10 according to this invention. The HDD 10 includes a hard disk controller (HDC) 12 that can include and/or be implemented by a microcontroller or microprocessor. The controller 12 runs a computer program that is stored in memory 14 and that embodies the logic and algorithms described further below. The memory 14 may be separate from controller 12 or as embedded memory on the controller chip. The computer program may also be implemented in microcode or other type of memory accessible to the controller 12.

The controller 12 is connected to a host interface 16 that communicates with the host computer 18. The host computer 18 may be a portable computer that can operate from battery power. The host interface 16 may be any conventional computer-HDD interface, such as Serial ATA (Advanced Technology Attachment) or SCSI (Small Computer System Interface).

While the top view of FIG. 1 shows only a single disk 24 and associated read/write head 22, the HDD 10 typically includes a stack of disks 24 that are mounted on a spindle 23 and rotated by a spindle motor (not shown), with each disk surface being associated with one of the heads 22. The read/write head 22 is typically a combination of an inductive write head with a magnetoresistive read head and is located on the trailing end or end face of a head carrier or slider 30. Slider 30 is supported on the actuator arm 31 by a suspension 32 that enables the slider to "pitch" and "roll" on an air-bearing generated by the disk 24 as it rotates in the direction of arrow 130.

The disk 24 has radially-spaced concentric data tracks, one of which is shown as track 101. Each data track has a reference index 121 indicating the start-of-track. The HDD 10 is illustrated as a zone-bit-recording (ZBR) HDD because the data tracks are grouped radially into a number of annular data bands or zones, three of which are shown as zones 151, 152 and 153, but the invention is fully applicable to a HDD that does not use ZBR, in which case the HDD would have only a single data zone. Within each zone, the tracks are also circumferentially divided into a number of contiguous physical data sectors, such as typical data sectors 164 in the radially outer data zone. Each data sector 164 is preceded by a synchronization (sync) field, such as typical sync fields 163. The sync fields 163 are detectable by the read head for enabling synchronization of reading and writing the data bits in the data sectors 164. A sync field 163 is a nondata region on the disk that is magnetized each time data is written in its associated data sector 164.

Each data track also includes a plurality of circumferentially or angularly-spaced servo sectors 120 that contain positioning information detectable by the read head for moving the head 22 to desired data tracks and maintaining the head 22 on the data tracks. The servo sectors in each track are aligned circumferentially with the servo sectors in the other tracks so that they extend across the tracks in a generally radial direction, as represented by radially-directed servo sectors 120. The servo sectors 120 are nondata regions on the disk that are magnetized once, typically during manufacturing or formatting of the disk, and are not intended to be erased during normal operation of the HDD. In each track, each servo sector 120 has a servo identification (SID) mark, also called a servo timing mark (STM), that indicates the beginning of the servo sector. Typically there are multiple data sectors 164 located between the servo sectors.

The electronics associated with HDD 10 also include servo electronics 40. In the operation of HDD 10, the read/write channel 20 receives signals from head 22 and passes servo information from the servo sectors 120 to servo electronics 40 and data signals from the data sectors 164 to controller 12. Servo electronics 40 typically includes a servo control processor that uses the servo information from the servo sectors 120 to run a control algorithm that produces a control signal. The control signal is converted to a current that drives actuator 28 to position the head 22. In the operation of HDD 10, interface 16 receives a request from the host computer 18 for reading from or writing to the data sectors 164. Controller 12 receives a list of requested data sectors from interface 15 and converts them into a set of numbers that uniquely identify the disk surface, track and data sector. The numbers are passed to servo electronics 40 to enable positioning head 22 to the appropriate data sector 164.

The controller 12 acts as a data controller to transfer blocks of write data from the host computer 18 through the read/write channel 20 for writing to the disks 24 by the heads 22, and to transfer blocks of read data from the disks 24 back to the host computer 18. HDDs typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. HDDs may also include nonvolatile memory. One type of nonvolatile memory is "flash" memory, which stores information in an array of floating gate transistors, called "cells" which can be electrically erased and reprogrammed in blocks. Thus in HDD 10, the controller 12 also communicates with volatile memory 50 (shown as DRAM) and optional nonvolatile memory 52 (shown as FLASH) via data bus 54.

To meet the demand for HDDs with high data density, the data track spacing or "pitch" has decreased, which means that the concentric tracks are packed closer together. This not only increases the error rate of the written track, but also increases the problem of adjacent track encroachment (ATE). In general, ATE occurs when old data stored in tracks adjacent to the track being written become degraded after many writings to the data track. ATE generally translates into an increase in bit error rate (BER), resulting in degradation of the performance of the disk drive. In some severe cases, poor BER will lead to a significant increase of unrecoverable data errors. ATE has been described by Zhihao Li et al., "Adjacent Track Erasure Analysis and Modeling at High Track Density", *IEEE TRANSACTIONS ON MAGNETICS*, VOL. 39, NO. 5, SEPTEMBER 2003, pp. 2627-2629.

Figure 2:
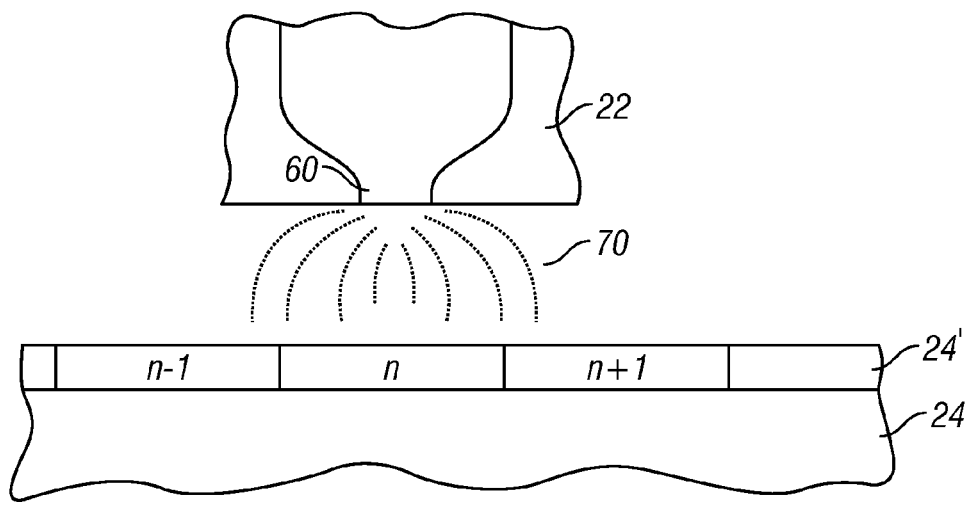
FIG. 2 is a sectional view of a disk and associated read/write head illustrating the problem of adjacent track encroachment (ATE) during writing.

The problem of ATE is shown schematically in FIG. 2, which is a sectional view of a disk 24 and associated read/write head 22. The disk 24 is shown with recording layer 24' having written data tracks n−1 to n+1. The write pole 60 of read/write head 22 generates a magnetic write field 70 directed to track n aligned with pole 60. However, the write field 70 is generally wider than a data track so when the write pole 60 is writing to track n, the outer portions (called the fringe field) of the write field 70 overlap onto at least tracks n+1 and n−1, the single tracks on either side of the track being written. This overlap is the ATE that will result in added noise and degradation of the data on the tracks n+1 and n−1. ATE may also occur in tracks more than one track, for example two tracks, away from the track being written.

One approach for addressing the ATE problem is to count the number of writes to each track. When a track has been written to a predetermined number of times, that track and one or more adjacent tracks on both sides of it are read and then rewritten. The effects of ATE cannot build up because significant repetitive writing of a single track is avoided. Because the adjacent tracks are rewritten before the ATE effects can build up, the reliability of the data on the adjacent tracks is improved. This approach is described in U.S. Pat. No. 7,567,400 B2, which is assigned to the same assignee as this application. Because HDDs may have a large number of tracks, e.g., several hundred thousand, a significant amount of memory may be required to store the counts for each track. Thus it has been proposed to group the tracks into segments, where each segment has the same fixed number of tracks, for example 4, and to count the number of writes to each segment. Like the approach of the '400 patent, when a segment has been written to a predetermined number of times, all the tracks in that segment and one or more tracks on both sides of that segment are read and then rewritten.

In this invention, adaptive counting of writes to the data tracks is used to minimize the effect of ATE. Because some data files are rewritten more often than others, these files result in "hotspots" on the disk, i.e., data sectors belonging to these files are rewritten more often than other data sectors. In this invention the tracks are grouped into segments and a counter is associated with each segment, but the number of tracks in a segment is not fixed, but varies or adapts depending on the number of writes to the segment. Thus a segment can have a "coarse" granularity, meaning that it has a relatively large number of tracks, or a "fine" granularity, meaning that it has a relatively small number of tracks. As the number of writes to a coarse segment increases, the segment is divided into a number of finer segments with fewer tracks. The adaptive granularity of the segments optimizes the trade-off between the amount of memory required for the counters and the disk drive performance overhead due to unnecessary read and rewrite operations. For fine granularity the memory requirement will be large because there will be a larger number of counters, but the disk drive performance overhead due to unnecessary read and rewrite operations will be small because fewer tracks will need to be read and rewritten. For coarse granularity the memory requirement will be small because there will be fewer counters, but the disk drive performance overhead will be greater because a large number of tracks will need to be read and rewritten.

Figure 3:
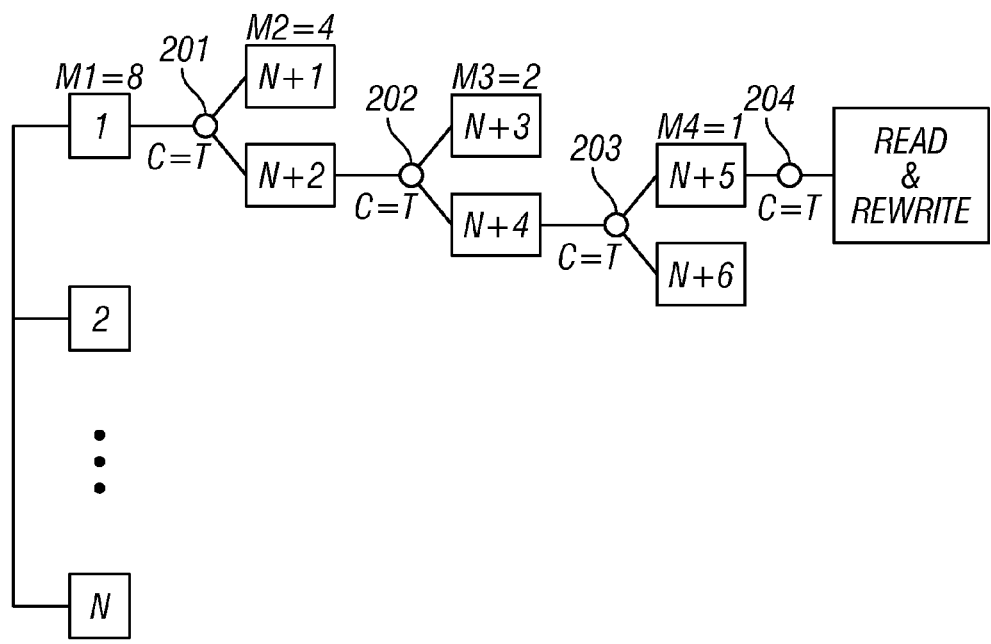
FIG. 3 is a decision tree illustrating one implementation of the adaptive counting approach of this invention for counting the number of writes to all the data tracks of a HDD.

FIG. 3 is a decision tree that illustrates one implementation of the invention. In the adaptive approach for counting the number of writes to all the data tracks, the number of segments changes and the number of tracks/segment (M) varies. As shown in FIG. 3, initially all the data tracks are grouped into N segments and each segment has M=M1 tracks, so there are N×M1 total tracks in the HDD. The values of N and M1 may be selected based on the particular HDD, e.g., on its intended use. Theoretically N could be 1, and M1 could be the total number of data tracks in the HDD. In the example of FIG. 1, M1=8 for the purpose of simplifying he explanation of this implementation of the invention. During operation the controller (HDC 12 in FIG. 1), or another controller or microprocessor in the HDD, identifies the segment where data blocks are written and counts the number of times data blocks are written to each of the N segments. Thus initially there are N counters and each counter is set to its initial value, typically 0. The count values are stored in memory associated with controller 12, for example memory 12, volatile memory 50 or nonvolatile memory 52.

When the count (C) for any segment reaches a predetermined threshold (T), that segment is divided into two segments, each with one-half the original M1 tracks. The value for T can be chosen based on the particular HDD, for example the known track density of the HDD and/or the intended purpose of the HDD, as well as on the BER of the HDD measured during manufacturing. In one example for a 2 Terabyte (TB) HDD, T may be 2 million. At decision node 201 the count C for segment 1 has reached the value T, and two new segments N+1 and N+2 are formed from excessively written segment 1. Each segment N+1 and N+2 has M=M2=M1/2=4 tracks. Segment 1 no longer exists and does not require memory to store its count. The count C for each segment N+1 and N+2 is set to 0, the operation continues and the controller 12 continues to keep track of the number of writes to all the segments, i.e., segments 2 to N+2. This process continues on the decision tree. At decision node 202 the count C for segment N+2 has reached the value T, and two new segments N+3 and N+4 are formed from excessively written segment N+2. Each segment N+3 and N+4 has M=M3=M2/2=2 tracks. Thus the granularity has decreased from 8 tracks/segment at segment 1 to 2 tracks/segment at segment N+3. Segment N+2 no longer exists and does not require memory to store its count. The operation continues and the controller 12 continues to keep track of the number of writes to all the segments, i.e., segments 2 to N+1, N+3 and N+4. At decision node 203 the count C for segment N+4 has reached the value T, and two new segments N+5 and N+6 are formed from excessively written segment N+4. Each segment N+4 and N+5 has M=M4=M3/2=1 track.

In the example of FIG. 3, the minimum value (MIN) for the number M of tracks/segment has been selected to be 1. However, MIN can be chosen to be greater than 1. The operation continues and the controller 12 continues to keep track of the number of writes to all the remaining segments, including segments N+5 and N+6. However, because each of these segments has M=M4=1=MIN, further division of these segments is terminated. Thus, as shown at decision node 204, if C=T for segment N+5, all of the tracks in this segment, and tracks radially adjacent to and on both sides of the tracks in segment N+5, are read and rewritten, preferably to the same tracks, and the counter C for segment N+5 is set to 0.

The invention has been described where the granularity is based on tracks/segment, so that as shown in the example of FIG. 3, the granularity decreases from 8 tracks/segment to 1 track/segment. However, the invention is also applicable to individual data sectors within the tracks. Referring again to FIG. 1, each data track has a plurality of data sectors 164. Typically a data sector has a fixed number, e.g., 512 or 4096, of bytes. There are a plurality of data sectors 164 between circumferentially adjacent servo sectors 120. Referring again to FIG. 3, at node 204, instead of reading and rewriting the single track of segment N+5 (and its radially adjacent tracks), the operation can continue at node 204 with the one-track segment N+5 being divided into sub-segments, where each sub-segment contains a plurality of the data sectors of that track. For example, if there are 200 servo sectors, segment N+5 may be divided into two sub-segments, where one sub-segment contains all the data sectors between servo sectors 1-100 and the other sub-segment contains all the data sectors between servo sectors 101-200. The process can continue as described above, using the decision C=T?, to further subdivide the sub-segments of data sectors into sub-segments with a smaller number of data sectors, thereby providing even finer granularity. In the above description of the invention T is selected to have the same value at each level of granularity. However, T can be selected to have different values each time a segment is divided into two smaller segments, for example T can be made smaller each time a segment is divided into two smaller segments.

The invention also includes a "garbage collection" (GC) process of the counters in memory that results in a re-grouping of the segments. GC can be performed after a predetermined time that the adaptive counting has been in operation, for example after a fixed time, on a regular basis such as at HDD start up, during idle time, or when the memory used approaches the memory allocated for the adaptive counting process. In one approach, a one-bit marker is assigned to each segment. During the adaptive counting process described above each segment marker is set to 1 the first time data is written to that segment. Then GC is performed and all segments are traversed and the ones with the markers set to 0 are segments identified as those that have not been written to since the last GC. These segments are regrouped into coarser granularity segments and the counters for those segments are freed up.

FIGS. 4A-4B are graphical illustrations of a disk before (FIG. 4A) and after (FIG. 4B) the operation described above. In FIG. 4A, there are 16 tracks having two segments A and B, each with 8 tracks/segment. In FIG. 4B, because of excessive writing to segment A, segment A has been divided into segments A1 and A2, each with 4 tracks/segment. Because of excessive writing to segment A2, segment A2 has been divided into segments A21 and A22, each with 2 tracks/segment. Because of excessive writing to segment A21, segment A21 has been divided into segments A211 and A212, each with 1 track/segment, the minimum value. The count for segment A211 (track 5) has reached the threshold T, so segment 211 and tracks adjacent to it are ready to be read and rewritten. A similar situation has occurred with segment B and segment B212, which contains one track (track 14), and tracks adjacent to it are ready to be read and rewritten. Thus tracks 5 and 14 can be considered "hotspots".

Referring to FIG. 4B, GC can then be performed to free up memory used to keep counts for the segments. After completion of a previous GC all the markers have been reset to 0. Any write to a segment will set the segment marker to 1 (i.e., marking it as recently used). Once a GC is started, the GC will traverse all the nodes and discover any segments with the markers still set to 0. For example, in FIG. 4B if segments A212 and A211 were never written to after the previous GC, then their markers would be set to 0. The GC would then regroup segments A211 and A212 into a single segment A21 and the counters for these segments would be freed up in memory.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

The invention claimed is:

1. A disk drive comprising:
a recording disk having a plurality of concentric data tracks for the storage of user data from a host computer;
a write head for writing data to the data tracks;
a controller for selecting the data tracks where data is to be written by the write head;
memory coupled to the controller; and
wherein the controller includes logic for executing method acts comprising:
(a) grouping the data tracks into segments having a plurality of data tracks;
(b) counting the number of writes to each segment and storing the counts in memory; and
(c) when a count reaches a threshold representing an excessively written segment, grouping the tracks in said excessively written segment into segments having fewer data tracks than said excessively written segment, and if said segments having fewer data tracks than said excessively written segment have not been written to in a predetermined time, regrouping said segments having fewer data tracks than said excessively written segment into a single segment and freeing the memory used for storing the counts for said segments having fewer data tracks than said excessively written segment.

2. The disk drive of claim 1 wherein the method acts further comprise:
repeating steps (b) and (c);
when the number of data tracks in a segment reaches a predetermined minimum, terminating step (c) as to said segment with said predetermined minimum number of data tracks.

3. The disk drive of claim 2 wherein the disk drive includes a read head for reading data from the data tracks and the method acts further comprise:
if the count for said segment having said predetermined minimum number of data tracks reaches said threshold, reading the data from all the data tracks in said segment having said minimum number of data tracks;

rewriting the data read from all the data tracks in said segment having said minimum number of data tracks; and
resetting the count for said segment having said minimum number of data tracks to zero.

4. The disk drive of claim 3 wherein reading the data further comprises reading the data from at least one track radially adjacent to and radially inner from said segment having said minimum number of data tracks, and at least one track radially adjacent to and radially outer from said segment having said minimum number of data tracks; and wherein rewriting the data comprises rewriting the data from said at least one track radially adjacent to and radially inner from said segment having said minimum number of data tracks, and said at least one track radially adjacent to and radially outer from said segment having said minimum number of data track.

5. The disk drive of claim 2 wherein said predetermined minimum is one.

6. The disk drive of claim 1 wherein each data track has a plurality of data sectors and the method acts further comprise:
repeating steps (b) and (c);
if the number of data tracks in a segment is one, counting the number of writes to said one-track segment; and
when the count for said one-track segment reaches said threshold, grouping said one data track in said one-track segment into a plurality of sub-segments having data sectors in said one track; and
counting the number of writes to each sub-segment.

7. The disk drive of claim 1 wherein the memory is non-volatile memory.

8. A magnetic recording disk drive comprising:
a magnetic recording disk having a plurality of concentric data tracks for the storage of data;
a write head for generating a magnetic write field to write data to the data tracks;
a read head for reading data written in the data tracks;
a controller for controlling the writing of data by the write head to the data tracks; and
memory coupled to the controller and containing a program of instructions readable by the controller for minimizing the effect of encroachment of the write field on data tracks adjacent to the data track being written, the program of instructions undertaking the method acts comprising:
(a) grouping the data tracks into segments each having the same number of data tracks;
(b) counting the number of times data is written to each segment;
(c) storing the count for each segment in memory;
(d) when a count reaches a predetermined threshold in a selected segment, dividing said selected segment into two segments each having one-half the number of data tracks of said selected segment;
(e) repeating steps (b) through (d); and
(f) if a segment contains a predetermined minimum number of data tracks and a count reaches a predetermined threshold in said segment having said minimum, reading the data from all the data tracks in said segment having said minimum and rewriting the data read from all the data tracks in said segment having said minimum number.

9. The disk drive of claim 8 wherein reading the data further comprises reading the data from at least one track radially adjacent to and radially inner from said segment having said minimum number of data tracks, and at least one track radially adjacent to and radially outer from said segment having said minimum number of data tracks; and wherein rewriting the data comprises rewriting the data from said at least one track radially adjacent to and radially inner from said segment having said minimum number of data tracks, and said at least one track radially adjacent to and radially outer from said segment having said minimum number of data track.

10. The disk drive of claim 8 wherein said predetermined minimum is one.

11. The disk drive of claim 8 wherein the method acts further comprise, if said two segments each having one-half the number of data tracks of said selected segment have not been written to in a predetermined time, regrouping said two segments each having one-half the number of data tracks of said selected segment into a single segment and freeing the memory used for storing the counts for said two segments each having one-half the number of data tracks of said selected segment.

12. A magnetic recording disk drive comprising:
a magnetic recording disk having a plurality of concentric data tracks for the storage of data;
a write head for generating a magnetic write field to write data to the data tracks;
a read head for reading data written in the data tracks;
a controller for controlling the writing of data by the write head to the data tracks; and
memory coupled to the controller and containing a program of instructions readable by the controller for minimizing the effect of encroachment of the write field on data tracks adjacent to the data track being written, the program of instructions undertaking the method acts comprising:
 (a) grouping the data tracks into segments each having the same number of data tracks;
 (b) counting the number of times data is written to each segment;
 (c) storing the count for each segment in memory;
 (d) when a count reaches a predetermined threshold in a selected segment, dividing said selected segment into two segments each having one-half the number of data tracks of said selected segment;
 (e) when a segment contains one and only one data track and the count for said one-track segment reaches said threshold, grouping said one data track in said one-track segment into a plurality of sub-segments having data sectors in said one track;
 (f) counting the number of times data is written to each sub-segment;
 (g) storing the count for each sub-segment in memory;
 (h) when a count for a selected sub-segment reaches a predetermined threshold, dividing said selected sub-segment into two sub-segments each having one-half the number of data sectors of said selected segment; and
 (i) when a sub-segment contains a predetermined minimum number of data sectors and a count reaches a predetermined threshold in said sub-segment having said minimum number of data sectors, reading the data from all the data sectors in said sub-segment having said minimum number of data sectors and rewriting the data read from all the data sectors in said sub-segment having said minimum number of data sectors; and
 (j) resetting the count for said sub-segment having said minimum number of data sectors to zero.

13. A disk drive comprising:
a recording disk having a plurality of concentric data tracks for the storage of user data from a host computer;
a write head for writing data to the data tracks;
a controller for selecting the data tracks where data is to be written by the write head;
memory coupled to the controller; and
wherein the controller includes logic for executing method acts comprising:
 (a) grouping the data tracks into segments having a plurality of data tracks;
 (b) counting the number of writes to each segment;
 (c) when a count reaches a threshold representing an excessively written segment, grouping the tracks in said excessively written segment into segments having fewer data tracks than said excessively written segment;
repeating steps (b) and (c);
if the number of data tracks in a segment is one, counting the number of writes to said one-track segment;
when the count for said one-track segment reaches said threshold, grouping said one data track in said one-track segment into a plurality of sub-segments having data sectors in said one track; and
counting the number of writes to each sub-segment.

* * * * *